Jan. 13, 1948.                    E. ANDERSON                        2,434,341
                          WING FLAP ACTUATING MECHANISM
                            Filed Sept. 2, 1943          4 Sheets-Sheet 1
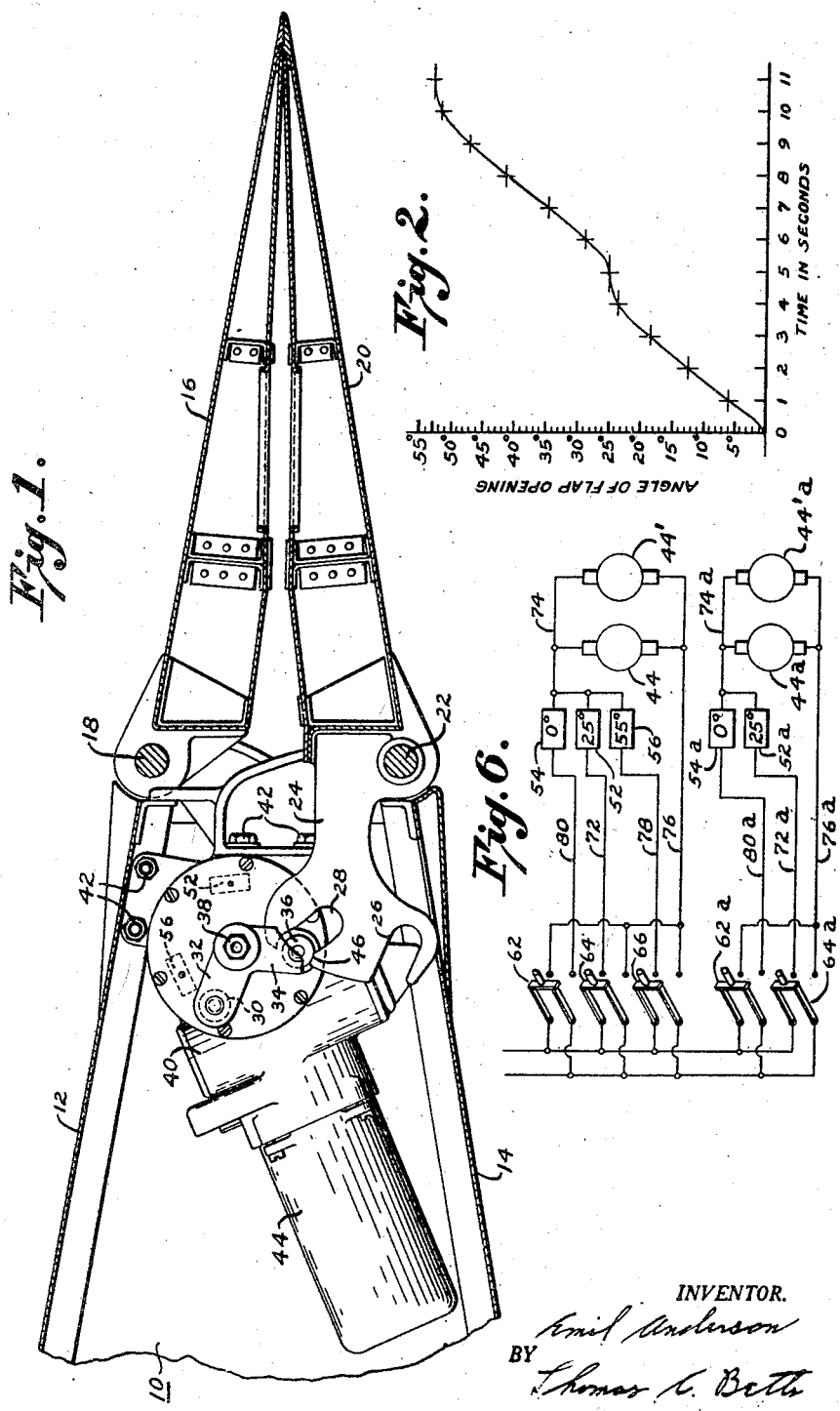
INVENTOR.
Emil Anderson
BY Thomas C. Betts
His Attorney

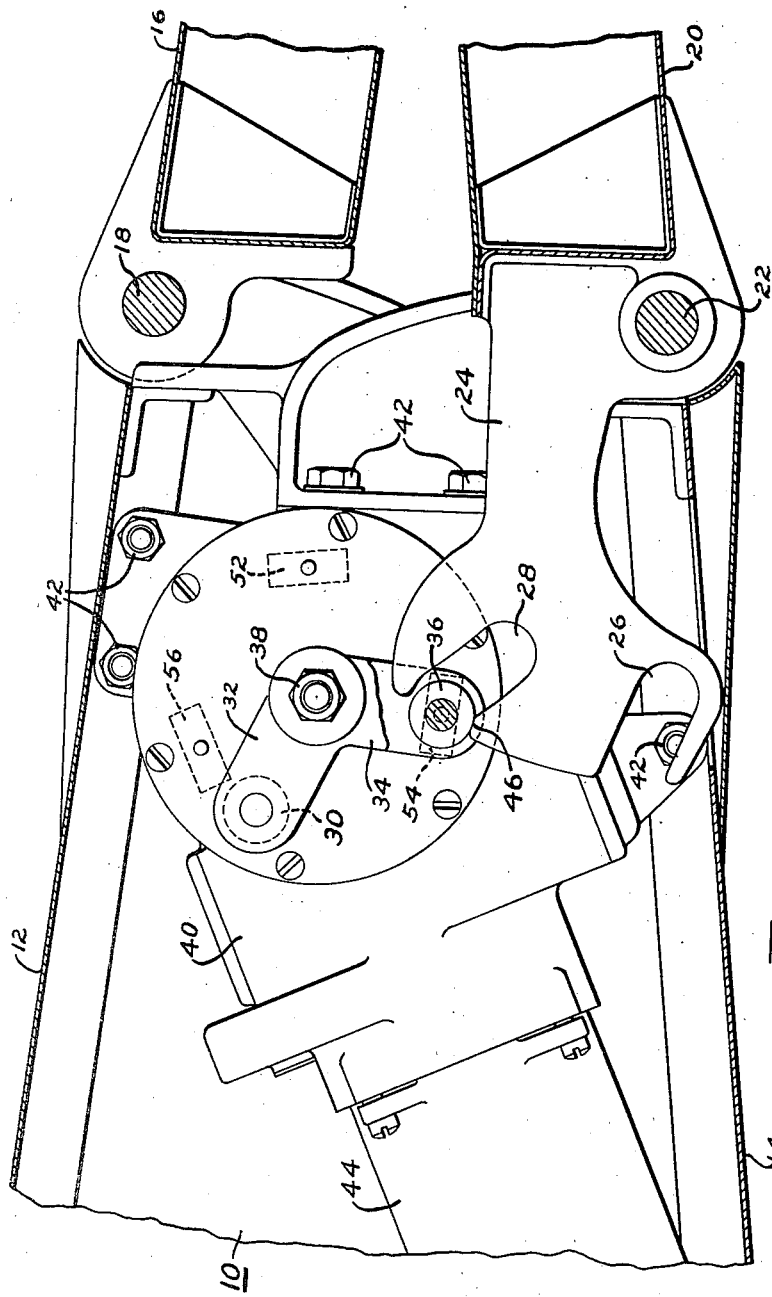

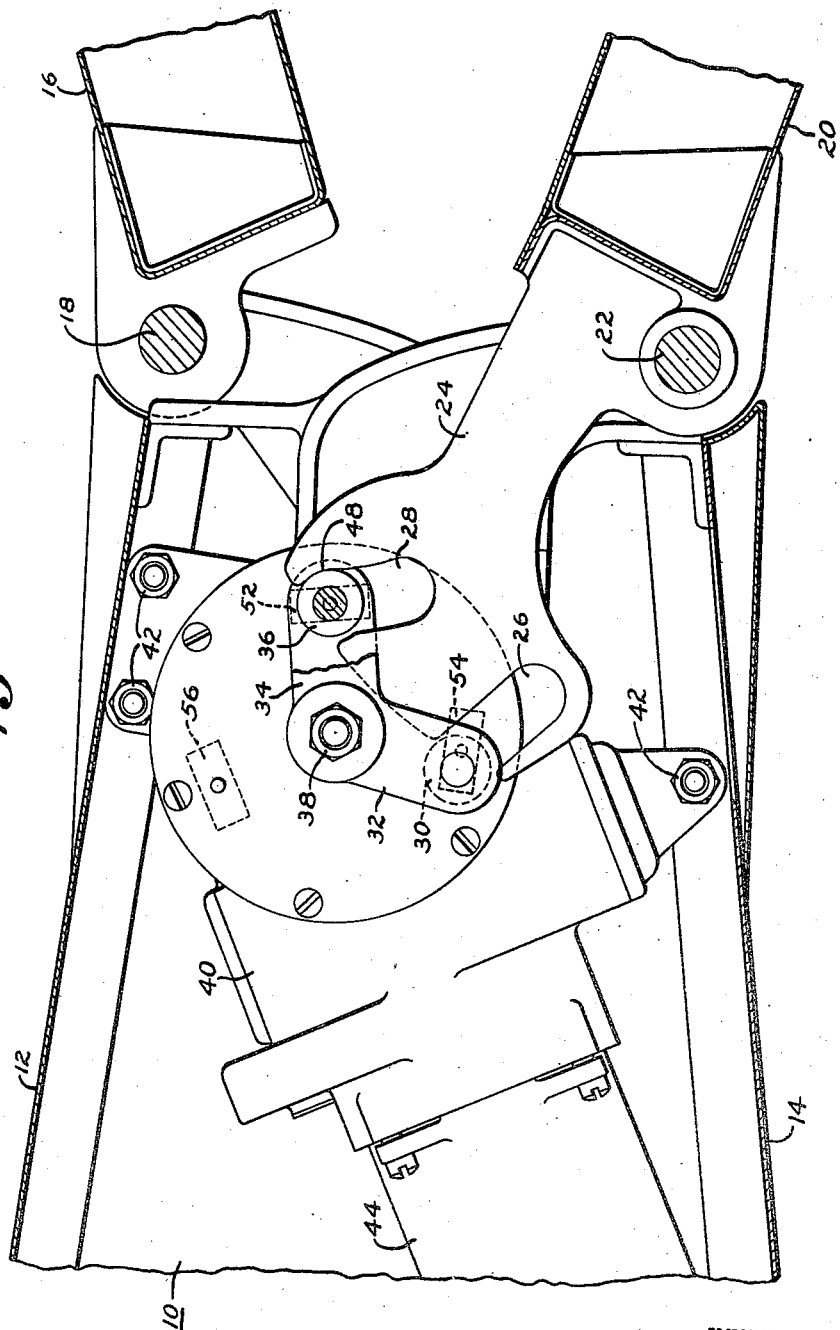

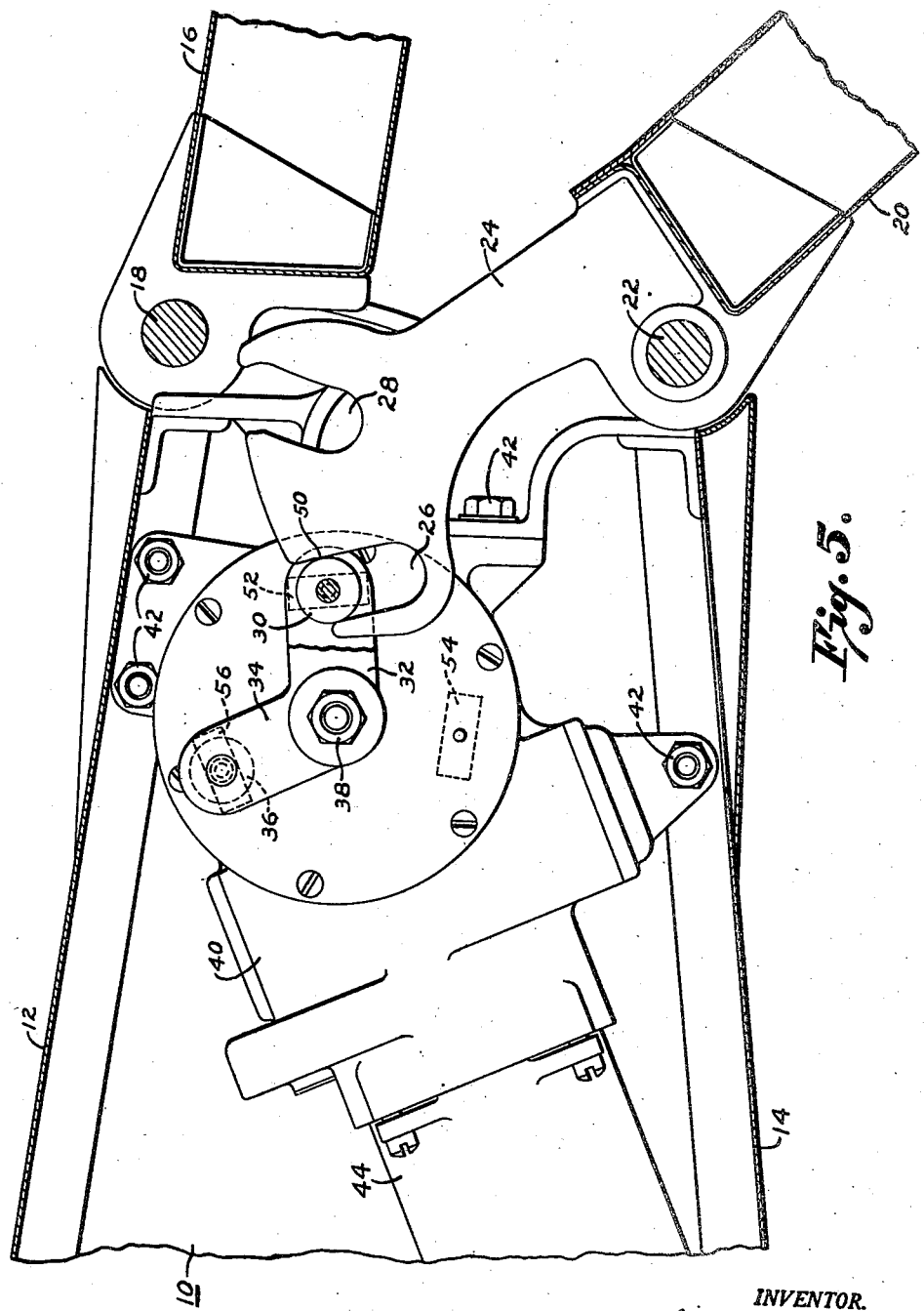

Patented Jan. 13, 1948

2,434,341

UNITED STATES PATENT OFFICE 2,434,341

WING FLAP ACTUATING MECHANISM

Emil Anderson, Briarcliff Manor, N. Y., assignor to Electrolux Corporation, Old Greenwich, Conn., a corporation of Delaware Application September 2, 1943, Serial No. 500,883

3 Claims. (Cl. 244—42)

My invention relates to improved actuating mechanism particularly adapted for pivoting flaps, such as wing flaps, on aircraft.

One of the objects of my invention is to provide actuating mechanism which will pivot the flaps to one or more predetermined positions in which the flaps will be locked in such a manner that force applied to the flap by the air stream cannot cause it to pivot, thus making it unnecessary to provide special brake means for retaining the flap in such positions.

Another object of my invention is to construct such mechanism as a torque converter in which the mechanical advantage is very great whenever the flap is in its closed position as well as when it is in one or more predetermined open positions, the mechanical advantage being less as the flap moves between such positions. This is of particular advantage if the flap is driven by an electric motor, as it enables the motor to start under substantially no load, thus keeping the starting current at a minimum value, and as the motor is substantially unloaded when it stops, practically no arcing occurs when the switch in the circuit of the motor is opened. Preferably, the mechanical advantage changes rapidly as the flap leaves and approaches the predetermined positions, and is substantially constant during the major portion of the movement of the flap, whereby the average rate of movement of the flap is high.

A still further object of my invention is to provide a mechanism which may be used without change to operate either the upper or the lower wing flaps, by merely reversing its position relative to the wing structure.

Further objects and advantages of my invention will be apparent from the following description considered in connection with the accompanying drawings which form a part of this specification and of which;

Fig. 1 is a cross-sectional view of a wing section having upper and lower wing flaps, and showing my invention applied to the lower flap;

Fig. 2 is a graph showing the angle of flap opening plotted against time;

Fig. 3 is a cross-sectional view of a portion of the wing section shown in Fig. 1, but on an enlarged scale.

Fig. 4 is at a view similar to Fig. 3, but with the upper and lower flaps opened to an angle suitable for diving;

Fig. 5 is a view similar to Fig. 4, but showing the upper flap closed and the lower flap opened to an angle suitable for landing or taking off; and Fig. 6 is a wiring diagram of a circuit for controlling the flap actuating motors.

Referring to Figs. 1, 3, 4 and 5, reference character 10 designates generally a hollow wing section having a fixed upper surface 12 and a fixed lower surface 14. Upper flap 16 is pivotally mounted at 18 to the trailing edge of the fixed surface 12, while a lower flap 20 is pivotally mounted at 22 to the trailing edge of the lower rigid surface 14, and when closed, as shown in Fig. 1, the flaps constitute portions of the smooth wing contour.

Rigidly secured to the lower flap 20 is an arm 24, which engages the pivot 22, and which is formed with two slots 26 and 28 providing cam surfaces. The cam surface of slot 26 is adapted to be engaged by a roller 30 rotatably mounted near the end of arm 32 of a bell-crank lever, the other arm 34 of which carries a roller 36 which engages the cam surface of slot 28. The bell-crank lever is rigidly secured, as by means of a nut 38 to the driven or output shaft of a gear reduction unit designated generally by reference character 40. This unit is rigidly secured within the hollow wing structure by means of nut and bolt connections 42. Secured to the case of the gear reduction unit is an electric motor 44, the armature shaft of which constitutes the driving or input shaft of the unit.

The upper flap 16 may be provided with actuating mechanism, including an arm rigid with the flap, bell-crank lever and motor-gear unit, which is identical with that described and which is located to one side of, and upside down with respect to the mechanism shown for the lower flap. The upper flap 16 is what is known as a diving flap and should be capable of being opened to an angle of approximately 25° when the aircraft is diving. At the same time, the lower flap which constitutes a combined diving and landing flap, should be opened through a like angle of 25°. As is well known, the opening of these flaps reduces the speed of the ship, thus permitting a steeper dive without the speed exceeding permissible limits, and also adds to the stability of the ship during the dive.

For landing purposes, the upper flap 16 should remain closed, while the lower flap 20 should be opened to a greater angle, usually in the neighborhood of 55°. Opening of the lower flap increases the lift of the wing, thus permitting lower landing speeds without stalling. The lower flap may also be opened during the take off to increase the lift of the wing, thus reducing the speed and the length of the runway necessary for the ship to get in the air.

The contours of the cam surfaces of the slots 26 and 28, and the angle between the arms 32 and 34 of the bell-crank lever are so chosen that the following conditions are fulfilled:

When the flaps are closed, as shown in Figs. 1 and 3, the point of tangency 46 between the lower edge of the slot 28 and the roller 36 lies substantially on the center line extending through the center of the roller 36 and the center of rotation of the bell-crank lever and therefore the cam surface of the slot at this point of tangency is normal to the center line. Consequently, any force tending to open the flaps, such as the force of gravity acting on the flap 20, or the vacuum acting on the flap 16 when the plane is in flight, is applied to the center of the driven shaft of the gear reduction unit, and consequently, has no tendency to rotate this shaft or the bell-crank lever.

By "substantially on the center line" is meant either actually on it or so close thereto that any component of force tending to rotate the bell crank is less than that required to overcome friction between the relatively moving parts.

Second, when the flaps are opened to the diving position of approximately 25° as shown in Fig. 4, the point of tangency 48 between the right hand edge of the slot 28 and the roller 36 lies substantially on the center line extending through the center of the roller 36 and the center of rotation of the bell-crank lever and hence the cam surface is normal to the center line at the point of tangency. Consequently, the force of the air stream which tends to rotate the lower flap in a counterclockwise direction, as viewed in Fig. 4 is applied along this center line and hence does not tend to rotate the bell-crank lever.

Third, when the lower flap is in its landing position, as shown in Fig. 5, the point of tangency 50 between the upper or right hand edge of the slot 26 and the roller 30 lies substantially on the center line extending through the center of this roller and the center of rotation of the bell-crank lever. As in the previous positions, the cam surface at the point of tangency is normal to the center line. Therefore, the force of the air stream which tends to rotate the flap in a counterclockwise direction acts through this center line and has no tendency to rotate the bell-crank lever.

The force thus applied to the driven shaft of the gear unit when the flaps are in any of these positions is taken solely by the bearings of this shaft and is not transmitted as a turning moment through any of the gearing of the reduction gear unit. Consequently the gearing is relieved of all strain and no braking means is required to hold the flaps in these positions.

Moreover, the cam surfaces are so formed that when the parts are in any of the positions shown in Figs. 3, 4, and 5, a comparatively large movement of the arms 32 and 34 is required to produce a small movement of arm 24, and consequently this results in a large torque multiplication, while during movement of the parts between these positions the torque multiplication is reduced to thus increase the rate at which the flap is pivoted.

The above described device operates as follows:

If it is desired to open both of the flaps from the closed position shown in Figs. 1 and 3 to the diving position shown in Fig. 4, the electric motor 44 is operated in the proper direction to cause the bell-crank lever to rotate in a counterclockwise direction. The roller 36 presses against the right hand edge of the slot 28, thus pivoting the arm 24 and the lower flap 20 in a clockwise direction. A suitable so-called limit switch 52 is provided for opening the circuit of the motor 44 when the arm 34 of the bell-crank lever has reached the position shown in Fig. 4. In this position the lower flap has been opened through an angle of approximately 25°. As above described, the point of tangency 48 lies on the center line of the roller 36 and the bell-crank lever, and consequently the air stream which acts against the lower surface of the flap 20 tending to pivot it in a counterclockwise direction to the closed position, acts along this center line and consequently has no tendency to rotate the bell-crank lever. At the same time a similar motor has opened the upper flap 16 through a like angle, and this flap is held in this position in the same manner.

When it is desired to close both the upper and the lower flaps from the 25° open position shown in Fig. 4, the motors actuating these flaps are caused to rotate in the opposite direction. Thus, the motor 44 which actuates the lower flap 20 is caused to rotate in the direction which drives the bell-crank lever in a clockwise direction, as viewed in the figures. The roller 36 on arm 34 of the lever consequently contacts the left hand or lower edge of the slot 28 in the arm 24 and causes this arm together with the lower flap 20 which is connected thereto to pivot in a counterclockwise direction. This movement continues until the arm 34 strikes a limit switch 54 which is so positioned in the housing of the gear reduction unit 40 as to be actuated by the arm 34 when the flap has been moved to its closed position. In this position the point of tangency 46 between the left hand or lower edge of slot 28 and the roller 36 lies on the center line of this roller and the center of rotation of the bell-crank lever. Consequently, as above described the force resulting from the weight of the lower flap, which tends to pivot this flap in a clockwise direction, is applied directly to the center of the driving shaft of the gear reduction unit and therefore has no tendency to rotate this shaft. At the same time, the upper flap 16 has been pivoted to close position in a similar manner, and is locked in this position against any tendency of the vacuum acting on the upper surface of the wing to open the flap.

If it is desired to open the lower flap 20 through an angle of approximately 55°, electric current is supplied to the motor 44 through a limit switch 56. This causes the bell-crank lever to be pivoted in a counterclockwise direction with the result that the roller 36 contacts the upper or right hand edge of the slot 28 to pivot the lower flap in a clockwise direction. When the flap has been opened through approximately 25°, the roller 36 leaves the slot 28 and the roller 30 enters the slot 26. This latter roller bears against the upper or right hand edge of the slot 26 and continues to pivot the lower flap in a clockwise direction to the position shown in Fig. 5, where the arm 34 actuates the limit switch 56 to open the motor circuit. In this position of the parts the point of tangency 50 between the roller 30 and the edge of slot 26 lies on the center line extending through the center of the roller and the center of rotation of the bell-crank lever and consequently, the force resulting from the air stream, which tends to pivot the lower flap to closed position, is applied directly to the center of the driving shaft of the gear reduction unit, and for the reasons previously described does not tend to pivot this shaft. Hence the flap is locked in this position.

When it is desired to close the lower flap, the motor is reversed as previously described so as to drive the bell-crank lever in a clockwise direction. Roller 30 bears against the lower or left hand edge of slot 26 and rotates the flap in a counterclockwise direction until the roller 36 enters the slot 28, whereupon this roller continues to pivot the flap until the arm 34 actuates the limit switch 54 to open the circuit of the motor.

A suitable electric circuit for operating the motors is illustrated in Fig. 6. Inasmuch as there are flaps in both wings of the aircraft, two reversible motors 44 and 44' are shown connecting in parallel for operating the lower flaps and two reversible motors 44a and 44'a are shown for operating the upper diving flaps. Reference character 60 designates a pair of conductors for supplying current to which are connected in parellel double pole single throw switches 62, 64 and 66 for controlling motors 44 and 44' and similar switches 62a and 64a for controlling motors 44a and 44'a. The positive side of switch 64 is connected by means of a conductor 72 to the limit switch 52 which is opened when the lower flap 20 has been opened through 25°. The other side of this switch is connected through conductor 74 with one side of the armatures of motors 44 and 44'. The other sides of the armatures are connected by means of conductor 76 with the negative poles of switches 64 and 66, and with the positive pole of switch 62. The positive pole of switch 66 is connected by means of a conductor 78 with the limit switch 56 which is opened when the lower flap has been pivoted through an angle of 55°. The other side of this switch is connected to the armature of the motors 44 and 44' by means of the conductor 74. The negative pole of switch 62 is connected by means of the conductor 80 with the limit switch 54 which is opened when the flap is pivoted to close position, and the other side of this switch is connected to the motors by the conductor 74.

The circuits for the motors 44a and 44'a, for operating the diving flap, is the same as that above described, with the exception that there is no limit switch corresponding to switch 56, inasmuch as the diving flaps are never opened to 55°. Hence there is no manual switch corresponding to the switch 66.

The above described circuit operates as follows:

If it is desired to open both the upper and lower flaps to 25° for diving, the switches 64 and 64a are both closed. Consequently, current is supplied from the positive pole of the switch 64 through the conductor 72, the limit switch 52 and the conductor 74 to the armatures of motors 44 and 44'. From the armatures the circuit is completed through the conductor 76 to the negative pole of switch 64. In the same manner, current flows from the positive pole of switch 64a through the conductor 72a, the limit switch 52a, the armatures of motors 44a and 44'a, and the conductor 76a back to the negative pole of switch 64a. Consequently, all of the motors are operated in a proper direction to open the various flaps. When the lower flaps have been opened through an angle of 25°, the limit switch 52 is opened, thus interrupting the armature circuit of motors 44 and 44'. Likewise, when the upper flaps have been opened through an angle of 25° the limit switch 52a is opened. Thereafter, the switches 64 and 64a should be manually opened.

When it is desired to close the flaps, switches 62 and 62a are closed. Current consequently flows from the positive pole of switch 62 through the conductor 76 to the armatures of motors 44 and 44' and hence through conductor 74, limit switch 54 and conductor 80 to the negative pole of switch 62. A similar flow of current takes place from the positive pole of switch 62a through conductor 76a, the armatures of motors 44a and 44'a, conductor 74a, limit switch 54a and conductor 80a to the negative pole of the switch 62a. It will hence be seen that the direction of flow of the current through the armatures of the motors has been reversed, and consequently the motors will rotate in the opposite direction, so as to close the flaps. This rotation will continue until the limit switches 54 and 54a are opened to thus interrupt the circuits of the respective motors.

If it is desired to open the lower landing flaps 20 to an angle of approximately 55°, the switch 66 is closed. Current is thus supplied to the armatures of motor 44 and 44' in the same manner as when switch 64 is closed, except that it flows from the positive pole of switch 66 through conductor 78 and limit switch 56. Consequently the motors 44 and 44' rotate until the limit switch 56 is opened, which occurs when the landing flap 20 has reached an angle of about 55°. The flap may be closed from this position by closing switch 62, whereupon the motors 44 and 44' rotate in the opposite direction, as above described until the limit switch 54 is opened, which occurs when the lower flaps are closed.

While the above described circuits are sufficient for illustrating the operation of the motors from the standpoint of the present invention, circuits more suitable for actual use in an aircraft form the subject matter of Patent No. 2,399,699 issued May 7, 1946, to Eric C. Wahlberg.

In Fig. 2 the angle of the flap opening has been plotted against time. Inasmuch as the motor 44, and consequently the bell-crank lever rotate at a substantially constant speed, the same curve would be obtained if the angle of the flap opening was plotted against the angle through which the bell-crank lever turns. From Fig. 2 it will be seen that the curve is very flat at its lower end, inasmuch as the gear ratio between motor and the flap is large, and hence the torque multiplication is likewise large when the flap first starts to open. Consequently, the motor may start under substantially no load. As the flap starts to open the curve becomes steep because the gear ratio has been reduced and the rate of opening of the flap is hence accelerated. As the flap approaches its 25° position, the curve again becomes flat and consequently the motor is operating under substantially no load when the limit switch 52 is opened. This is of a material advantage, inasmuch as it practically eliminates all danger of arcing at the contacts when the switch is opened.

As the flap goes beyond the 25° position, the curve again becomes steep until the flap approaches its 55° position whereupon the curve again flattens out. Consequently, the motor is operating under practically no load when the limit switch 56 is opened, and thus arcing at the contacts is eliminated.

When the flap is closed from either the 55° or the 25° positions, the motor is able to start under substantially no load and when the limit switch 54 is opened as the flap reaches its closed position, the motor is operating under substantially no load and therefore arcing in the points of this switch is eliminated.

It will thus be seen that the motor always starts under practically no load, thus reducing the starting current required, and always stops under practically no load, thus eliminating arcing when the circuit is opened by the various limit switches. Likewise, whenever the flaps are in either their closed position, or open to diving or landing positions, there is no tendency for any of the forces applied to the flaps to cause rotation of the driving shaft of the gear reduction unit, and consequently the flaps are effectively locked in any of these positions without requiring the provision of special braking means or the like.

While I have shown one more or less specific embodiment of my invention, it is to be understood that this has been done for purposes of illustration only, and is not to be considered as limiting the scope of my invention, which is to be determined by the appended claims.

What I claim is:

1. In an aircraft, a wing, a wing flap pivotally mounted with respect thereto, a rotatable shaft, a pair of angularly disposed arms rotatable by said shaft, a lever secured to said flap and formed with a pair of cam surfaces thereon, and cam actuating means carried by each of said arms and cooperating with the respective cam surfaces for transmitting torque from said arms to rotate said lever, the contours and relative disposition of said cam surfaces and the angle between said arms being such that in at least two positions of rotation of said lever extraneous force applied to said flap tending to rotate said lever is transmitted through one of said cam surfaces and the cooperating cam actuating means in a line normal to the one cam surface at the point of contact with the cooperating means and intersecting the center of rotation of said shaft and in at least another position of rotation of said lever such an extraneous force is transmitted through the other of said cam surfaces and the cam actuating means cooperating therewith in a line normal to said other cam surface at the point of contact with the cooperating means and intersecting said center of rotation.

2. In an aircraft, a wing, a wing flap pivotally mounted with respect thereto, a reversible electric motor having a circuit for forward operation and a circuit for reverse operation, switching means for opening the first-mentioned circuit when said flap has been opened through a predetermined angle, switching means for opening the second-mentioned circuit when the flap has been pivoted back to closed position, and torque converting means for transmitting torque from said motor to said flap, said converting means increasing the torque multiplication as said flap reaches said predetermined angle and as said flap reaches closed position, whereby said motor is substantially unloaded when either of said circuits is opened.

3. In an aircraft, a wing, a wing flap pivotally mounted with respect thereto and pivotal from a closed position to a partially open diving position and to a more open landing position, a reversible electric motor having circuits for forward and reverse operation, switching means for opening a circuit for forward operation when the flap is pivoted to said diving position, switching means for opening a circuit for forward operation when the flap is pivoted to said landing position, switching means for opening a circuit for reverse operation when the flap is pivoted to said closed position, and torque converting means for transmitting torque from said motor to said flap, said converting means increasing the torque multiplication as said flap reaches each of said diving, landing and closed positions, whereby said motor is substantially unloaded when the circuits are opened.

EMIL ANDERSON.

REFERENCES CITED

The following references are of record in the file of this patent:

UNITED STATES PATENTS

| Number | Name | Date |
| --- | --- | --- |
| 2,119,089 | Zaparka | May 31, 1938 |
| 2,193,554 | Dale | Mar. 12, 1940 |
| 2,097,932 | McKee | Nov. 2, 1937 |
| 1,367,931 | Varnum | Feb. 8, 1921 |
| 1,609,292 | Burch | Dec. 7, 1926 |
| 558,972 | Meyer | Apr. 28, 1896 |
| 454,983 | Mills | June 30, 1891 |
| 2,206,326 | Ludwig et al. | July 2, 1940 |
| Re. 20,075 | Barnhart | Aug. 25, 1936 |
| 1,854,444 | Barnhart | Aug. 19, 1932 |
| 2,279,615 | Bugatti | Apr. 14, 1942 |
| 1,129,391 | Hohne et al. | Feb. 23, 1915 |
| 1,636,674 | Luther | July 19, 1927 |
| 2,360,333 | De Port | Oct. 17, 1944 |

FOREIGN PATENTS

| Number | Country | Date |
| --- | --- | --- |
| 199,399 | Great Britain | June 15, 1923 |
| 539,625 | Great Britain | Sept. 18, 1941 |